(12) United States Patent
Williams et al.

(10) Patent No.: US 9,975,086 B2
(45) Date of Patent: May 22, 2018

(54) METHODS AND SYSTEMS FOR DRYING HYDROGEN GAS USED IN HYDROGEN-COOLED GENERATORS

(71) Applicant: Environment One Corporation, Niskayuna, NY (US)

(72) Inventors: Robert A. Williams, Burnt Hills, NY (US); Ronald F. Brosnihan, Troy, NY (US)

(73) Assignee: Environment One Corporation, Niskayuna, NY (US)

( * ) Notice: Subject to any disclaimer, the term of this patent is extended or adjusted under 35 U.S.C. 154(b) by 266 days.

(21) Appl. No.: 14/934,991

(22) Filed: Nov. 6, 2015

(65) Prior Publication Data

US 2016/0129390 A1 May 12, 2016

Related U.S. Application Data

(60) Provisional application No. 62/076,211, filed on Nov. 6, 2014.

(51) Int. Cl.
*B01D 53/02* (2006.01)
*B01D 53/26* (2006.01)
(Continued)

(52) U.S. Cl.
CPC .......... *B01D 53/261* (2013.01); *B01D 53/04* (2013.01); *B01D 53/0454* (2013.01);
(Continued)

(58) Field of Classification Search
CPC ........ B01D 2251/108; B01D 2251/404; B01D 2256/16; B01D 2257/80;
(Continued)

(56) References Cited

U.S. PATENT DOCUMENTS 4,783,432 A * 11/1988 Settlemyer ........... B01D 53/261
502/34
5,123,277 A * 6/1992 Gray .................. B01D 53/0454
34/80
(Continued)

OTHER PUBLICATIONS

BAC-50 Automatic Continuous Hydrogen Dryer, available from Lectrodryer, L.L.C. of Richmond, Kentucky, printout available on Nov. 6, 2015, at http://media.wix.com/ugd/eb494b_3149ee6e84844880a5e105e665494caa.pdf, 5 pages, at least as early as Jul. 28, 2010.

(Continued)

*Primary Examiner* — Christopher P Jones
(74) *Attorney, Agent, or Firm* — Heslin Rothenberg Farley & Mesiti P.C.

(57) ABSTRACT

A hydrogen gas dryer or system for drying or removing water from hydrogen gas for use in hydrogen-cooled generators includes a drying tower or column comprising a housing, a heater, a desiccant, and a controller. The system is configurable and operable for regeneration of the saturated column, with activation of the heater to cause water retained in the saturated desiccant to turn into steam such as steam and exit on its own via the vent. A supply of generally dry hydrogen is used to purge the remaining vaporized water from the isolated substantially dry regenerated desiccant.

22 Claims, 12 Drawing Sheets

(51) Int. Cl.
*B01D 53/04* (2006.01)
*C01B 3/56* (2006.01)
*H02K 9/10* (2006.01)
*H02K 9/26* (2006.01)

(52) U.S. Cl.
CPC .......... *B01D 53/0462* (2013.01); *C01B 3/56* (2013.01); *B01D 53/0438* (2013.01); *B01D 2251/108* (2013.01); *B01D 2251/404* (2013.01); *B01D 2256/16* (2013.01); *B01D 2257/80* (2013.01); *B01D 2259/40001* (2013.01); *B01D 2259/402* (2013.01); *B01D 2259/40043* (2013.01); *B01D 2259/40096* (2013.01); *C01B 2203/042* (2013.01); *C01B 2203/0495* (2013.01); *H02K 9/10* (2013.01); *H02K 9/26* (2013.01)

(58) Field of Classification Search
CPC ........... B01D 2259/40001; B01D 2259/40043; B01D 2259/2259; B01D 2259/402; B01D 53/04; B01D 53/0438; B01D 53/0454; B01D 53/0462; B01D 53/261; C01B 2203/042; C01B 2203/0495; C01B 3/56; H02K 9/10; H02K 9/26
See application file for complete search history.

(56) References Cited

U.S. PATENT DOCUMENTS

| | | | |
|---|---|---|---|
| 6,959,585 | B2 | 11/2005 | Brosnihan et al. |
| 7,179,320 | B2* | 2/2007 | Iies ............... B01D 53/261 |
| | | | 95/122 |
| 7,448,252 | B2 | 11/2008 | Brosnihan et al. |
| 2003/0090164 | A1* | 5/2003 | Brosnihan .......... H02K 9/10 |
| | | | 310/55 |
| 2006/0057034 | A1* | 3/2006 | Speranza .......... G05D 21/02 |
| | | | 422/105 |

OTHER PUBLICATIONS

Generator Gas Dryer II, available from Environment One Corporation, Niskayuna, New, York, 2 pages, at least as early as Nov. 15, 2011.

Generator Gas Dryer III Handout, Environment One Corporation, Niskayuna, New, York, 1-page, handout available at Power-Gen International 2013, Orlando, Florida, Nov. 12, 2013 to Nov. 14, 2013.

Generator Gas Dryer III, available from Environment One Corporation, Niskayuna, New, York, printout available on Dec. 3, 2016, at http://pl.eone.com/utility-systems/regions/us/generator-systems/ggd/, 9 pages, Jul. 5, 2014.

* cited by examiner

METHODS AND SYSTEMS FOR DRYING HYDROGEN GAS USED IN HYDROGEN-COOLED GENERATORS

CLAIM TO PRIORITY

This application claims the benefit of U.S. Provisional Patent Application No. 62/076,211, filed Nov. 6, 2014, entitled "Methods And Systems For Drying Hydrogen Gas Used In Hydrogen-Cooled Generators", which is hereby incorporated herein by reference in its entirety.

FIELD OF THE INVENTION

The present disclosure relates generally to hydrogen-cooled generators, and more particularly to methods and systems for drying hydrogen gas used in hydrogen-cooled generators.

BACKGROUND OF THE INVENTION

Hydrogen-cooled generators are often used by power utilities for generating electricity. Typically contaminants in the hydrogen cooling gas hydrogen-cooled generators need to be removed.

FIG. 1 diagrammatically illustrates a prior art "open" regenerative system 100 available from Environment One of Niskayuna, N.Y., for drying hydrogen gas used in a hydrogen-cooled generator. System 100 is configured as a dual-chamber system operable to continuously dry and recirculate generator cooling gas even when the generator is on turning gear. The system includes a first drying tower or column 110 and a second tower or column 130. Each of the columns includes a housing 112 and 132, a heater 114 and 134, and a desiccant 116 and 136, respectively. During normal operation, hydrogen gas from the hydrogen-cooled generator enters the upper end of column 110, passes through desiccant 116 to the lower end of the column, and the dried hydrogen gas is returned to the hydrogen-cooled generator. Generally during normal operation of column 110 for drying a supply of hydrogen gas from the hydrogen-cooled generator, heater 114 of column 110 is not activated and a valve 180 is closed so that no flow of dry hydrogen gas supplied via conduits 162 and 164 to second column 130.

As shown in FIG. 1, system 100 is configured for drying hydrogen gas from the hydrogen-cooled generator, and at the same time, operable to regenerate saturated desiccant 136 in second column 130. In particular, valves or manifolds 150 and 160 operably connect first column 110 for drying hydrogen gas from the hydrogen-cooled generator. At the same time, valves or manifolds 150 and 160 operably connect second column 130 for regeneration of desiccant 136 in second column 130. In the configuration for regenerating second column 130, a continuous supply of dried hydrogen gas from first column 110 is also supplied to second column 130 via valve or manifold 160 and operable conduits 162 and 164. During the process of regenerating the desiccant in the second column, heater 134 is turned on to heat the desiccant to turn the water in the desiccant into steam which steam is carried along with the supply of dry hydrogen from conduit 164 and exhausted out of the second column, via conduits 172 and 174 to a vent 176. Once the desiccant in second column is dried, heater 134 is turned off and valve 180 is closed. At an appropriate time, valves or manifolds 150 and 160 may be operated to operably connect the second column for drying the hydrogen gas in the hydrogen-cooled generator, and at the same time, regenerate the desiccant in the first column. The column regeneration is automated via a controller 190 and takes place based on programmable inlet and outlet dew point levels. The heater heats the desiccant to about 300 degrees Celsius, and the regenerative process takes about 2 hours to about 3 hours.

FIG. 2 diagrammatically illustrates a prior art "closed" regenerative system 200 available from Lectrodryer, L.L.C. of Richmond, Ky. under the model name BAC-50 for drying hydrogen gas used in a hydrogen-cooled generator. System 200 is configured as a continuous operating automatic twin tower. The system includes a first drying tower or column 210 and a second tower or column 230. Each of the columns includes a housing 212 and 232, a heater 214 and 234, and a desiccant therein, respectively. During normal operation, hydrogen gas (illustrated in black arrows in FIG. 2) from the hydrogen-cooled generator enters the lower end of column 210, passes through the desiccant to the upper end of the column, and the dried hydrogen gas is returned to the hydrogen-cooled generator. In the closed regenerative system of FIG. 2, a closed loop of hydrogen gas (illustrated in white arrows in FIG. 2) circulates while heater 234 is turned on to turn the water in the desiccant in column 230 into steam. The closed loop circulation of hydrogen gas carries the steam out of the column. A cooler 220 then cools the steam and hydrogen gas, via cooling water or other refrigerant, to condense the steam into water which condensed water is removed in a trap 250 and exhausted out via a drain 260.

There is a need for further methods and systems for drying hydrogen gas used in hydrogen-cooled generators.

SUMMARY OF THE INVENTION

The present disclosure provides, in a first aspect, a method for use drying hydrogen for use in a hydrogen-cooled generator. The method includes passing a supply of a portion of the hydrogen gas in the hydrogen-cooled generator through a desiccant and returning the supply of the portion of the hydrogen gas passed through the desiccant to the hydrogen-cooled generator to substantially saturate the desiccant, isolating the saturated desiccant from fluid communication with the hydrogen-cooled generator and from the atmosphere, heating the substantially saturated desiccant to vaporize water in the isolated desiccant, venting the vaporized water to atmosphere from the isolated saturated desiccant to substantially dry the isolated saturated desiccant, introducing a supply of generally dry hydrogen to purge remaining vaporized water from the isolated substantially dry desiccant, and passing a supply of a portion of the hydrogen in the hydrogen-cooled generator through the substantially dry desiccant and returning the supply of the portion of the hydrogen passed through the substantially dry desiccant to the hydrogen-cooled generator to saturate the desiccant.

The present disclosure provides, in a second aspect, a method for drying hydrogen for use in a hydrogen-cooled generator. The method includes connecting a supply of a portion of the hydrogen gas in the hydrogen-cooled generator through a column comprising a desiccant and returning the supply of the portion of the hydrogen gas passed through the column and the desiccant to the hydrogen-cooled generator to saturate the desiccant, blocking the supply of the portion of the hydrogen in the hydrogen-cooled generator to the column, blocking the returning of the supply of the portion of the hydrogen passed through the column, heating the substantially saturated desiccant to vaporize water in the column while allowing vaporized water to vent to atmosphere on its own from the column to substantially dry the saturated desiccant, connecting a supply of generally dry hydrogen to purge remaining vaporized water from the substantially dry desiccant, and connecting a supply of a portion of the hydrogen in the hydrogen-cooled generator through the substantially dry desiccant and returning the supply of the portion of the hydrogen passed through the substantially dry desiccant to the hydrogen-cooled generator to saturate the desiccant.

The present disclosure provides, in a third aspect, a hydrogen gas drying system for use with a hydrogen-cooled generator. The system includes a column comprising a desiccant, a heater operable for heating the column and the desiccant, a fluid control device for passing a supply of a portion of the hydrogen gas in the hydrogen-cooled generator through a desiccant and returning the supply of the portion of the hydrogen passed through the desiccant to the hydrogen-cooled generator to saturate the desiccant, and a controller. The controller is operable to control the fluid control device to isolate the substantially saturated desiccant from fluid communication with the hydrogen-cooled generator and from the atmosphere, operable to control the heater for heating the substantially saturated desiccant to vaporize water in the isolated desiccant, operable to control venting vaporized water to atmosphere from the isolated saturated desiccant to substantially dry the isolated saturated desiccant, operable to control introduction of a supply of generally dry hydrogen to purge remaining vaporized water from the isolated substantially dry desiccant, and operable to control the fluid control device to reconnect passage of a supply of a portion of the hydrogen gas in the hydrogen-cooled generator through the substantially dry desiccant and return the supply of the portion of the hydrogen passed through the substantially dry desiccant to the hydrogen-cooled generator to saturate the desiccant.

The present disclosure provides, in a fourth aspect, a hydrogen gas drying system for use with a hydrogen-cooled generator. The system includes a column, a desiccant disposed in the column, a first control device for controlling fluid communication of a supply of hydrogen gas from the hydrogen-cooled generator to the column, and for controlling fluid communication between the column and a vent, a second control device for controlling fluid communication of the supply of hydrogen gas from the column to the hydrogen-cooled generator, a heater operable for heating the column and the desiccant, and a heater.

The controller is operable to control the first control device to block the supply of hydrogen gas from the hydrogen-cooled generator to the column, operable to control the second control device to block return of the supply of the hydrogen gas to the column, operable to control the heater to vaporize water in the substantially saturated column which vaporized water vents to atmosphere on its own from the column to substantially dry the saturated desiccant, and operable to control a supply of generally dry hydrogen gas to purge remaining vaporized water from the substantially dry column, and the controller operable to control the first control device and the second control device to permit fluid communication between the hydrogen-cooled generator and the column.

BRIEF DESCRIPTION OF THE DRAWINGS

The subject matter which is regarded as the invention is particularly pointed out and distinctly claimed in the concluding portion of the specification. The invention, however, may be understood by reference to the following detailed description of the following embodiments and the accompanying drawings in which:

DETAILED DESCRIPTION OF THE INVENTION

Figure 1:
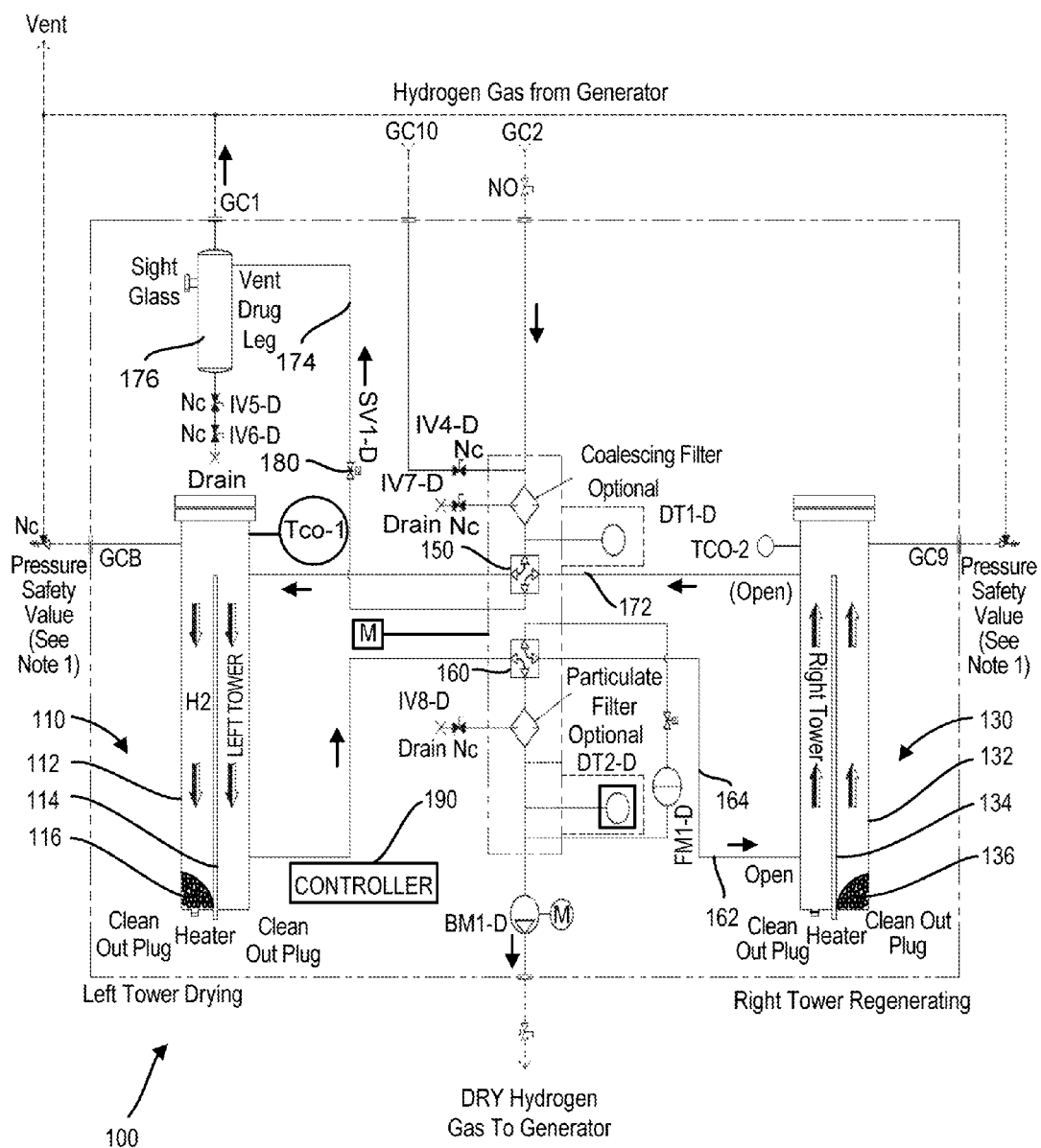
FIG. 1 is diagrammatic illustration of a prior art system for removing water from hydrogen gas in a hydrogen-cooled generator employing a "open" regenerative process.
Figure 2:
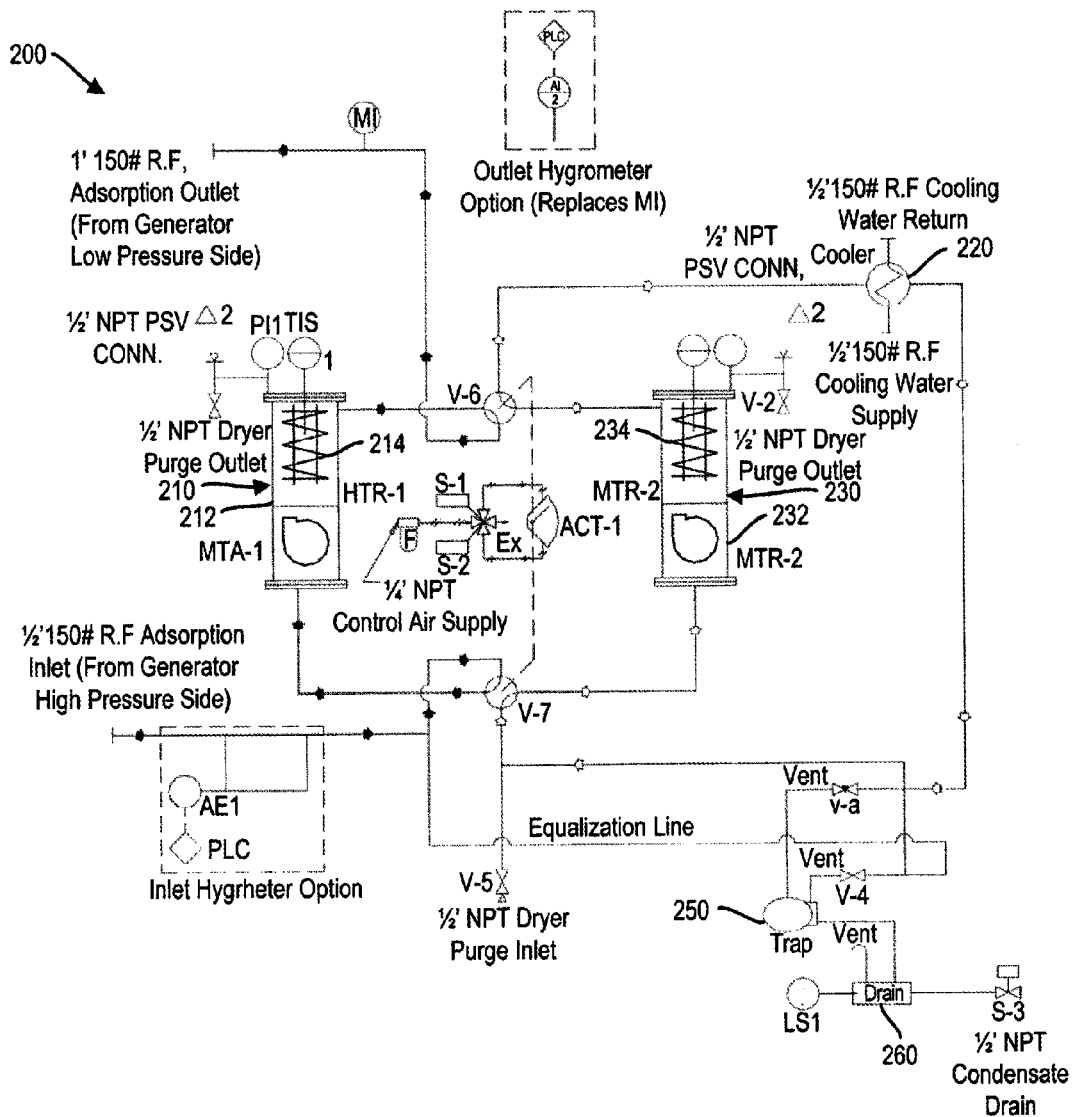
FIG. 2 is diagrammatic illustration of a prior art system for removing water from hydrogen gas in a hydrogen-cooled generator for employing a "closed" regenerative process.
Figure 3:
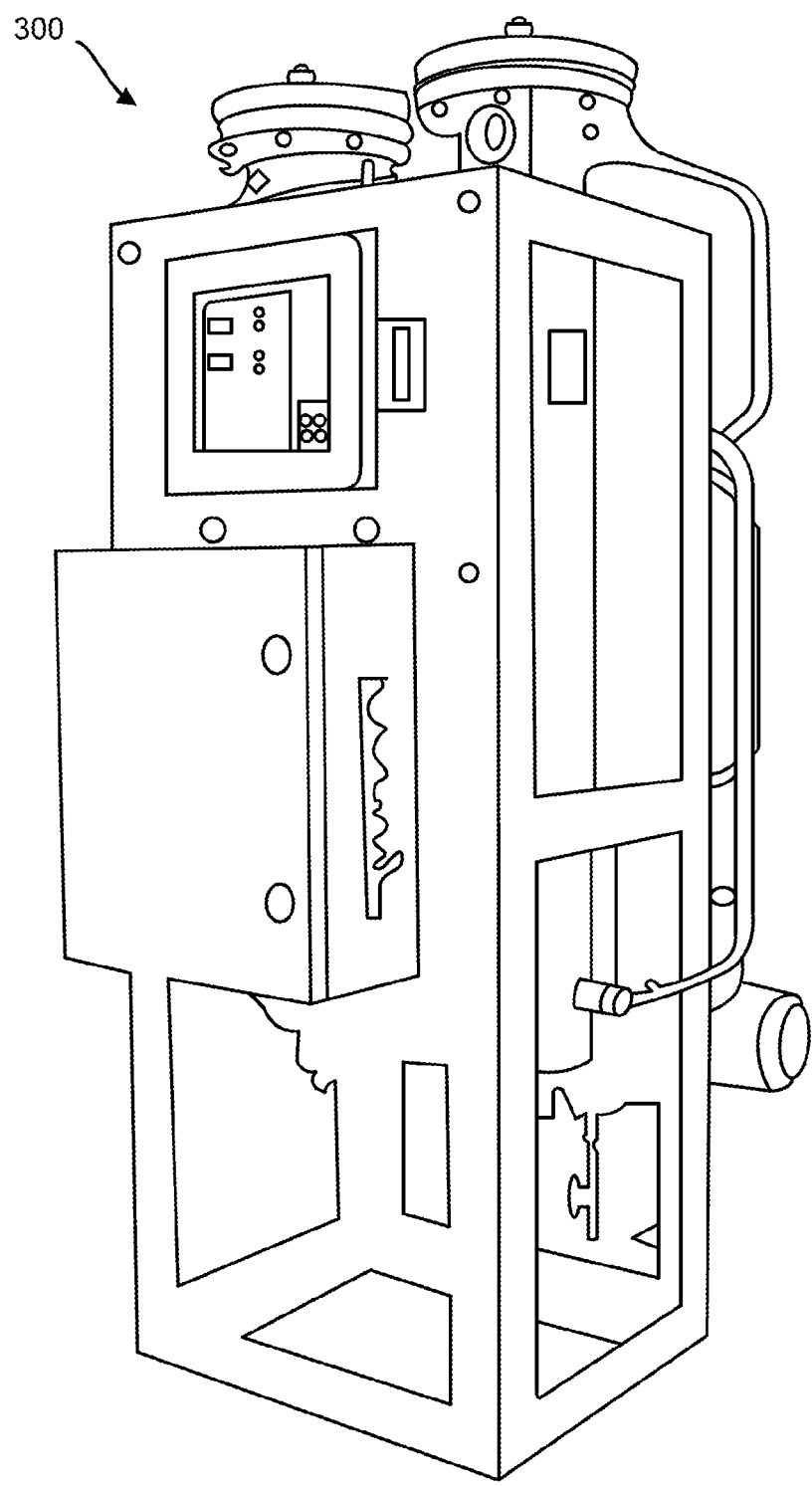
FIG. 3 is a perspective view of one embodiment of a hydrogen gas dryer or system for removing water from hydrogen gas in a hydrogen-cooled generator in accordance with aspects of present disclosure.

FIG. 3 illustrates a hydrogen gas dryer or system 300 for drying or removing water from hydrogen gas for use in hydrogen-cooled generators in accordance with aspects of the present disclosure. System 300 may also remove others contaminants from the hydrogen cooling gas during generator operation. For example, water, oil and other contaminants often cause corrosion in critical areas of hydrogen-cooled generators and contribute to windage losses and reduction in operational efficiency and increasing the likelihood of forced outages. The system may allow for comprehensive water and contaminant removal, microprocessor control, hazardous location operation, and employ a self-monitored drying process.

System 300 may be configured as a dual-chamber system that continuously dries and recirculates generator cooling gas even when the generator is on turning gear so as to maintain low dew point. Column regeneration may be automated and take place based on programmable, optional inlet and outlet dew point levels or programmable, time-based regeneration such as from about 1 to about 30 days. As will become apparent from the description below, system 300 may reduce the amount of hydrogen used in the regenerative process of a saturated or wet column. For example, less than about 1 cubic meter of hydrogen may be required or consumed per regeneration. Other advantages of the technique of the present disclosure may include increasing generator efficiency and reducing downtime.

Figure 4:
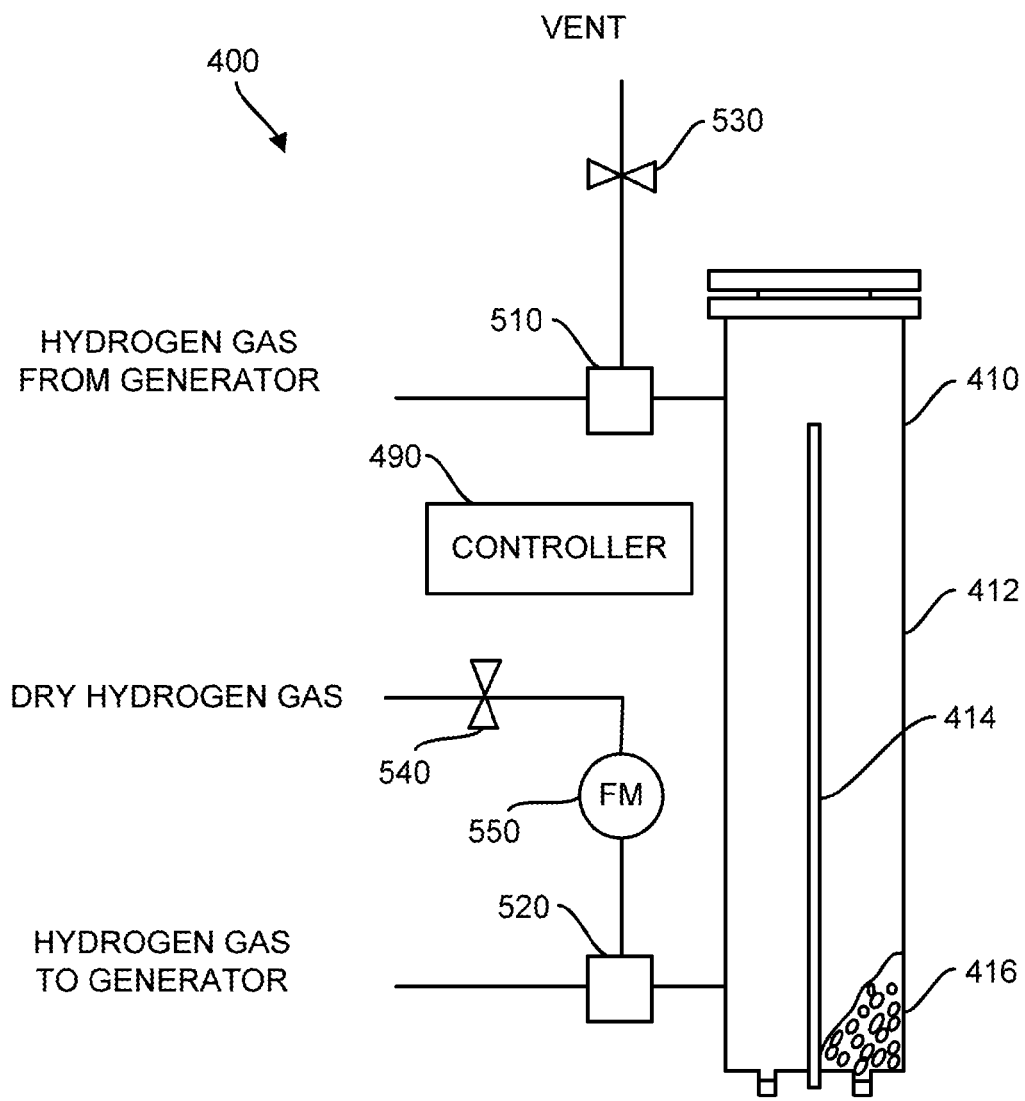
FIG. 4 is a diagrammatic illustration of another embodiment of a hydrogen gas dryer or system for drying or removing water from hydrogen gas for use in hydrogen-cooled generators in accordance with aspects of the present disclosure.

FIG. 4 is a diagrammatic illustration of another embodiment of a hydrogen gas dryer or system 400 for drying or removing water from hydrogen gas for use in hydrogen-cooled generators in accordance with aspects of the present disclosure and may be incorporated in the system of FIG. 3. In this illustrated embodiment, system 400 may include a drying tower or column 410. The columns includes a housing 412, a heater 114, and a desiccant 416. Other embodiments of a hydrogen gas dryer or system may include more than one tower and associated components, for example, as described in greater detail below.

System 400 may also include a plurality of control valves and a controller 490 operable for controlling system 400 during normal use to dry hydrogen used in the hydrogen-cooled generator, during regeneration of a saturated column, and purging of the column prior to employing the regenerated column back in service for drying of hydrogen gas used in the hydrogen-cooled generator.

Figure 5:
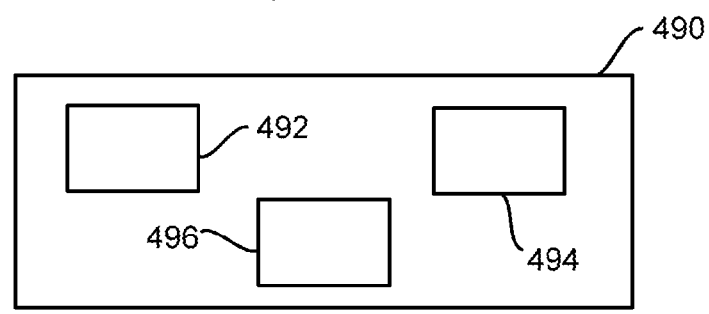
FIG. 5 is a diagrammatic illustration of the controller of FIG. 4.

For example, system 400 may include a first valve 510 generally operably connectable for receiving hydrogen gas from a hydrogen-cooled generator and operably connectable to a vent. A second valve 520 may be generally operably connectable to return hydrogen gas to the hydrogen-cooled generator and operably connectable to a supply of generally dry hydrogen gas. A third valve 530 may be provided for passage fluid in the column to the vent. A fourth valve 540 may be provided for passage of generally dry hydrogen gas to and prevention of generally dry hydrogen gas to the column. A flow meter 550 may be provided for regulating the flow of generally dry hydrogen gas. The controller or computing unit 490 may be operably connectable for control of the various valves. As shown in FIG. 5, the controller may include a suitable logic chip, microcontroller, or processor 492, memory 494, and one or more input/output devices 496.

Figure 6:
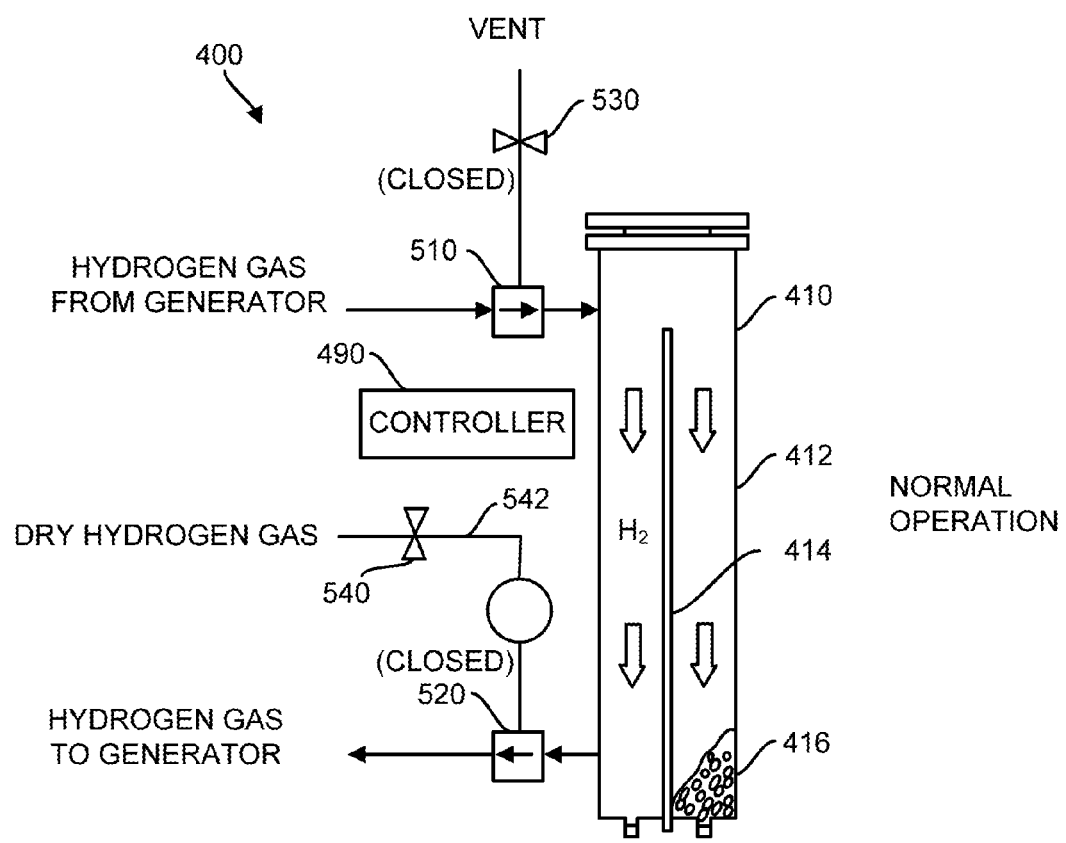
FIG. 6 is a diagrammatic illustration the system of FIG. 4 configured for normal operation to dry hydrogen gas for use in the hydrogen-cooled generator in accordance with aspects of the present disclosure.

FIG. 6 illustrates system 400 configured for normal operation to dry hydrogen gas for use in the hydrogen-cooled generator in accordance with aspects of the present disclosure. During normal operation, hydrogen gas from the hydrogen-cooled generator enters the upper end of column 410, passes through desiccant 416, to the lower end of the column, and the dried hydrogen gas is returned to the hydrogen-cooled generator. For example, first valve 510 may provide flow of hydrogen gas from the generator in a first direction to the upper end of the column while preventing flow of hydrogen gas from the generator in a second direction to the vent, and second valve 520 may provide flow of dried hydrogen gas from the lower end of the column to the hydrogen-cooled generator while preventing flow of dry hydrogen gas via conduit 542. For example, valves 510 and 512 may be three-way valves. In this normal operation configuration, valves 530 and 540 may be closed.

Figure 7:
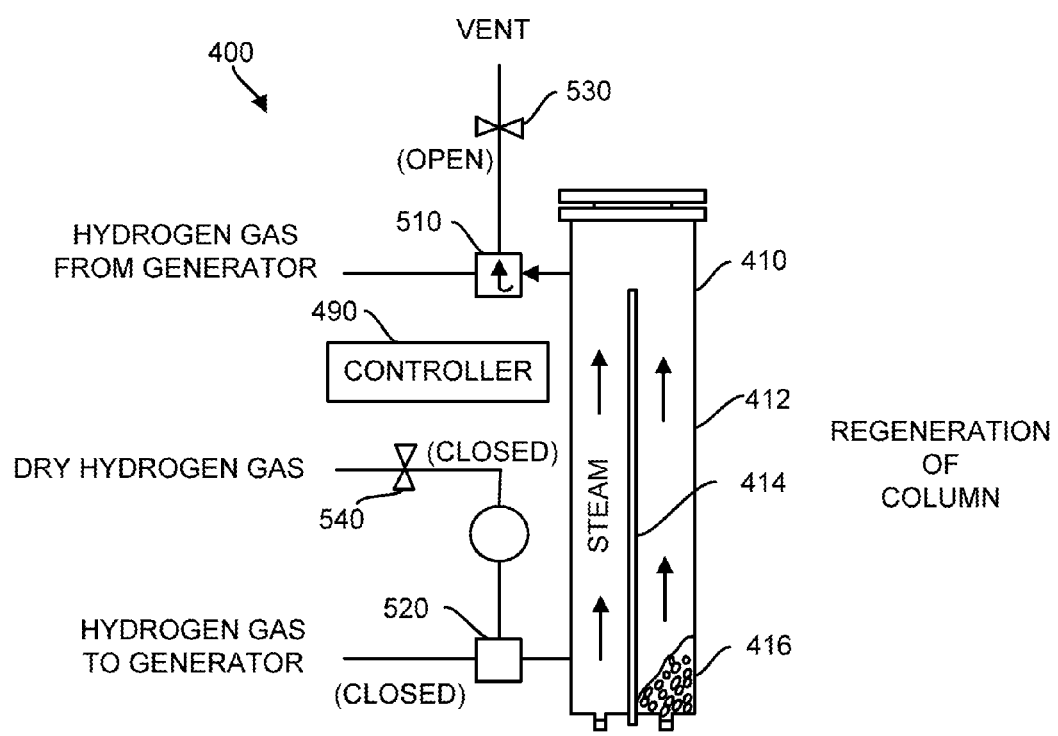
FIG. 7 is a diagrammatic illustration the system of FIG. 4 configured for regenerating a saturated column in accordance with aspects of the present disclosure.

FIG. 7 illustrates system 400 configured for regeneration of a saturated column in accordance with aspects of the present disclosure. The present technique during regeneration of the saturated column employs the column being generally disconnected or otherwise generally isolated from the hydrogen-cooled generator. For example, hydrogen gas from the hydrogen-cooled generator is prevented from entering the upper end of column 410, and hydrogen gas in the column is prevented from returning to the hydrogen-cooled generator. In addition, the upper end of the column is placed in fluid communication with the vent, while the lower end of the column is closed such as via valve 520 and valve 540 being disposed closed positions. For example, first valve 510 may provide flow of steam from the upper end of the column in a second direction out to the vent and to the atmosphere, while preventing flow of hydrogen gas from the generator to the column. Second valve 520 may provide fluid communication between the lower end of the column and valve 540 which is disposed in a closed position. In this configuration the column may be provided with a single outlet. Alternatively, more than one vent outlet may be suitably provided. In this configuration for regeneration of the saturated column, the heater is activated to cause water retained in the saturated desiccant to turn into steam and to exit on its own via the vent, for example, via passing through operable conduits and valves 510 and 530. The generation of steam may result in the steam in the column having a pressure above atmospheric pressure. The heater may heat the desiccant to about 300 degrees Celsius, and the regenerative process may take about 2 hours to about 4 hours. As will be appreciated from the present description, system 400 configured for regeneration avoids or eliminates the introduction of dry hydrogen gas, such as from the hydrogen-cooled generator or a separate dry hydrogen supply, during regeneration of the saturated column, e.g. no carrier gas need be used, thereby reducing the cost associated with supplying dry hydrogen gas during the drying cycle which hydrogen gas would be exhausted via the vent.

Figure 8:
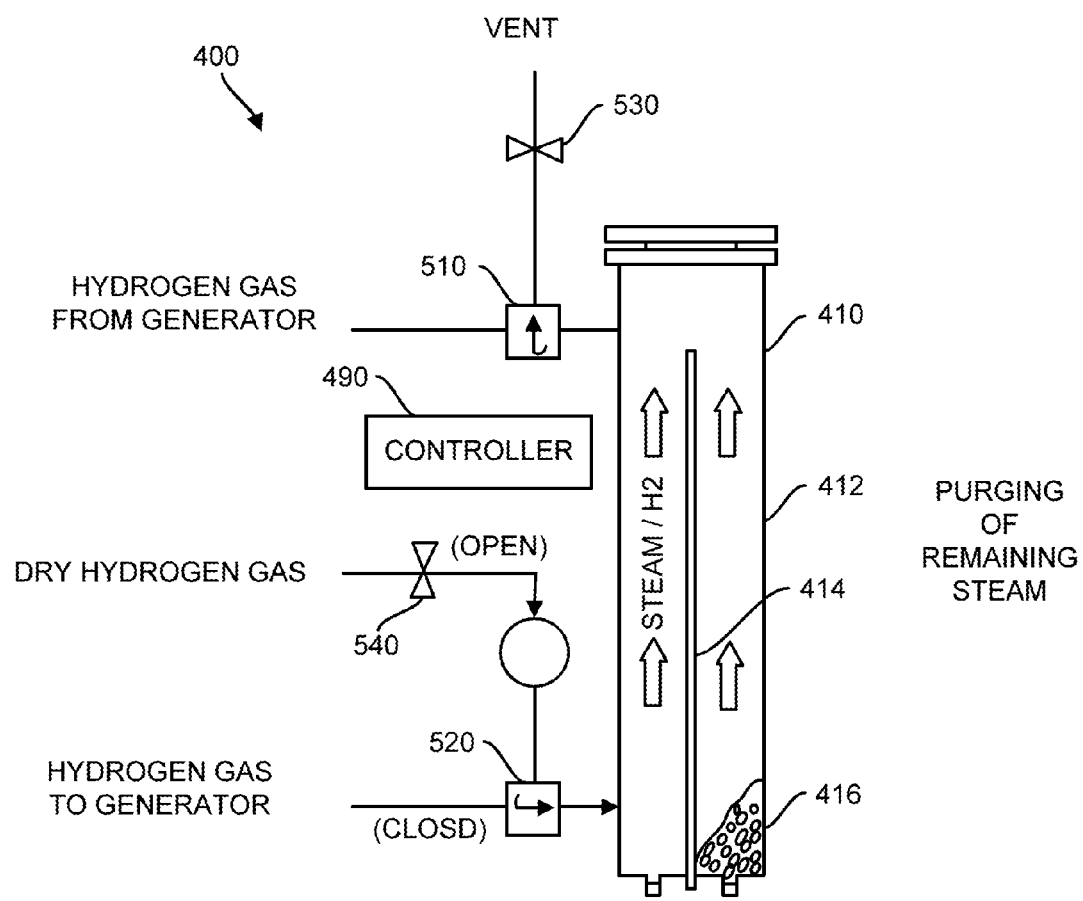
FIG. 8 is a diagrammatic illustration the system of FIG. 4 configured for purging remaining steam from the column prior to reconfiguring the system for use in drying hydrogen gas for use in the hydrogen-cooled generator in accordance with aspects of the present disclosure.

FIG. 8 illustrates system 400 configured for purging any remaining steam in the column after regeneration prior to reconnecting the flow of hydrogen gas through the column back to the hydrogen-cooled generator in accordance with aspects of the present disclosure. The present technique employs during purging of the column the column being generally disconnected or otherwise generally isolated from the hydrogen-cooled generator. For example, hydrogen gas from the hydrogen-cooled generator is prevented from entering the upper end of column, and return fluid communication to the hydrogen-cooled generator is prevented or blocked. In addition, the upper end of the column is placed in fluid communication with the vent, while the lower end of the column is in fluid communication with a supply of dry hydrogen via valves 520 and 540. In this configuration the column is provided with a single input and a single outlet. Alternatively, more than one vent outlet may be suitably provided. In this configuration, the heater may be activated while the dry hydrogen gas is introduced to purge the remaining steam in the column and exit the steam and hydrogen gas via the vent, for example, via passing through operable conduits and valves 510 and 530. The purging process may take from about 1 minute to about 30 minutes, and desirably about 10 minutes. In an alternative embodiment, during the purging process, the dry hydrogen may be supplied from the hydrogen gas in the hydrogen-cooled generator. For example, the heating and allowing the vaporized water to vent may be performed for a first predetermined time, and the purging process of supplying generally dry hydrogen to purge remaining vaporized water from the substantially dry desiccant for a second predetermined time of about one-tenth to about one-twentieth of the first predetermined time.

After purging the column, system 400 may be operably configured as shown in FIG. 6 for normal operation in removing water or moisture from the hydrogen in the hydrogen-cooled generator. Controller 490 may be suitably programmed to automatically control the operation of the various valves during normal operation, regeneration, and purging of the column, as described above.

Figure 9:
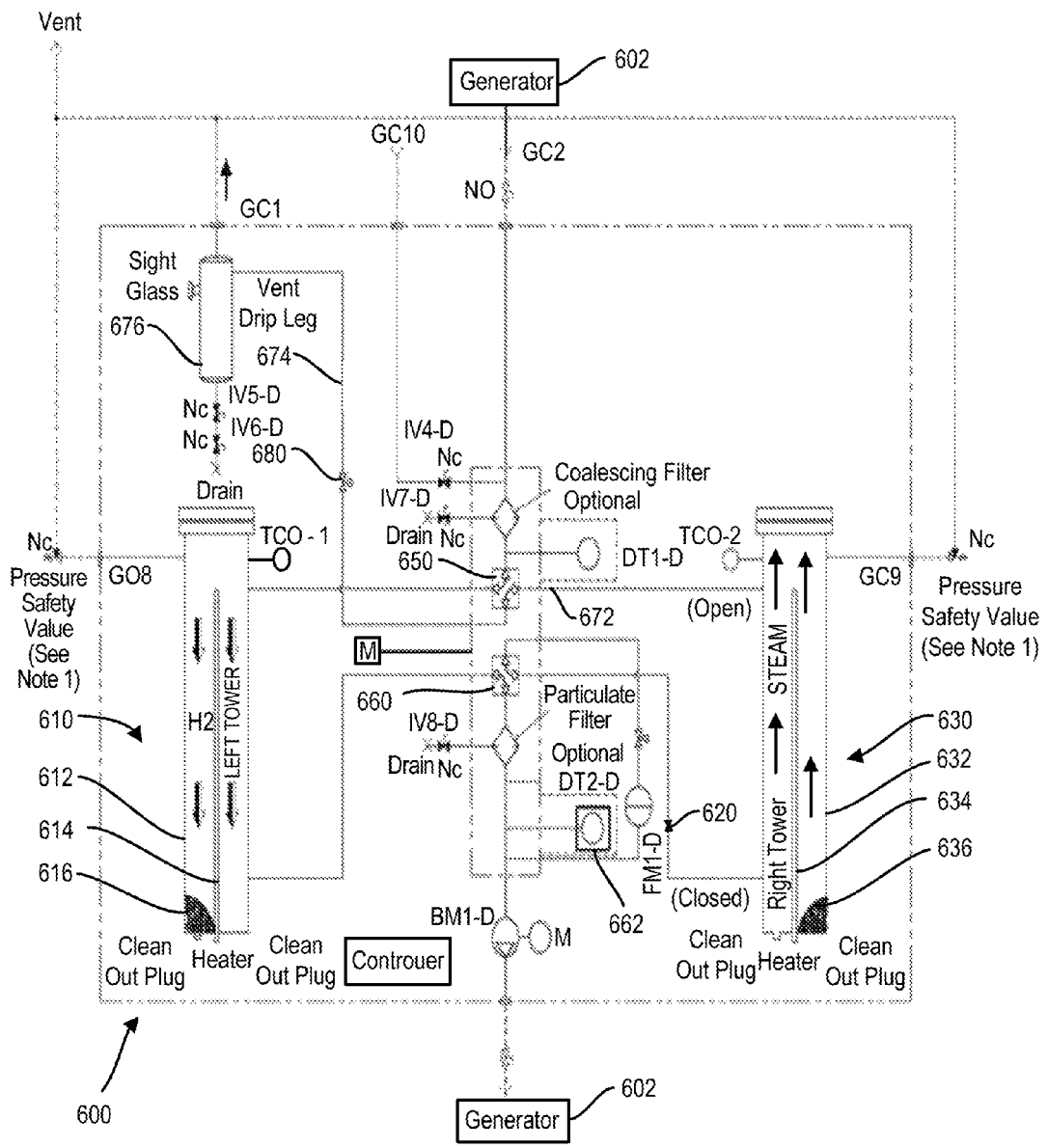
FIG. 9 is a diagrammatic illustration of another embodiment of a hydrogen gas dryer or system comprising dual columns for drying or removing water from hydrogen gas for use in hydrogen-cooled generators in accordance with aspects of the present disclosure.

FIG. 9 is a diagrammatic illustration of another embodiment of a hydrogen gas dryer or system 600 comprising dual columns for drying or removing water from hydrogen gas in accordance with aspects of the present disclosure for use in hydrogen-cooled generators and may be incorporated in the system of FIG. 3. In this illustrated embodiment, system 600 is operable as a dual-chamber system for continuous dry and recirculation of generator cooling gas even when the generator is on turning gear. The system includes a first drying tower or column 610 and a second tower or column 630. Each of the columns includes a housing 612 and 632, a heater 614 and 634, and a desiccant 616 and 636, respectively. During normal operation, hydrogen gas from a hydrogen-cooled generator 602 enters the upper end of column 610, passes through desiccant 616, to the lower end of the column, and the dried hydrogen gas is returned to the hydrogen-cooled generator. Generally, during normal operation of column 110 for drying a supply of hydrogen gas from the hydrogen-cooled generator, heater 614 of column 130 is off or otherwise not activated, and a valve 180 is closed so that no flow of dry hydrogen gas is supplied to second column 630.

As shown in FIG. 9, system 600 is configured and illustrated for drying hydrogen gas from the hydrogen-cooled generator, and at the same time, operable to regenerate saturated desiccant 636 in second column 630. In particular, valves or manifolds 650 and 660 operably connect first column 610 for drying a supply of hydrogen gas from the generator. At the same time, valves or manifolds 650 and 660 operably connect second column 630 for regeneration of desiccant 636 in second column 630. In the configuration for regenerating second column 630, a valve 620 is closed to inhibit or prevent supply of dried hydrogen gas from first column 610 to second column 630. During the process of regenerating the desiccant in the second column, heater 634 is turned on to heat the desiccant and turn the water in the desiccant into steam which steam on its own is exhausted out of the second column via conduits 672 and 674, through a valve 680 disposed in an open position, to a vent 676. The generation of steam may result in the steam in the column having a pressure above atmospheric pressure.

Figure 10:
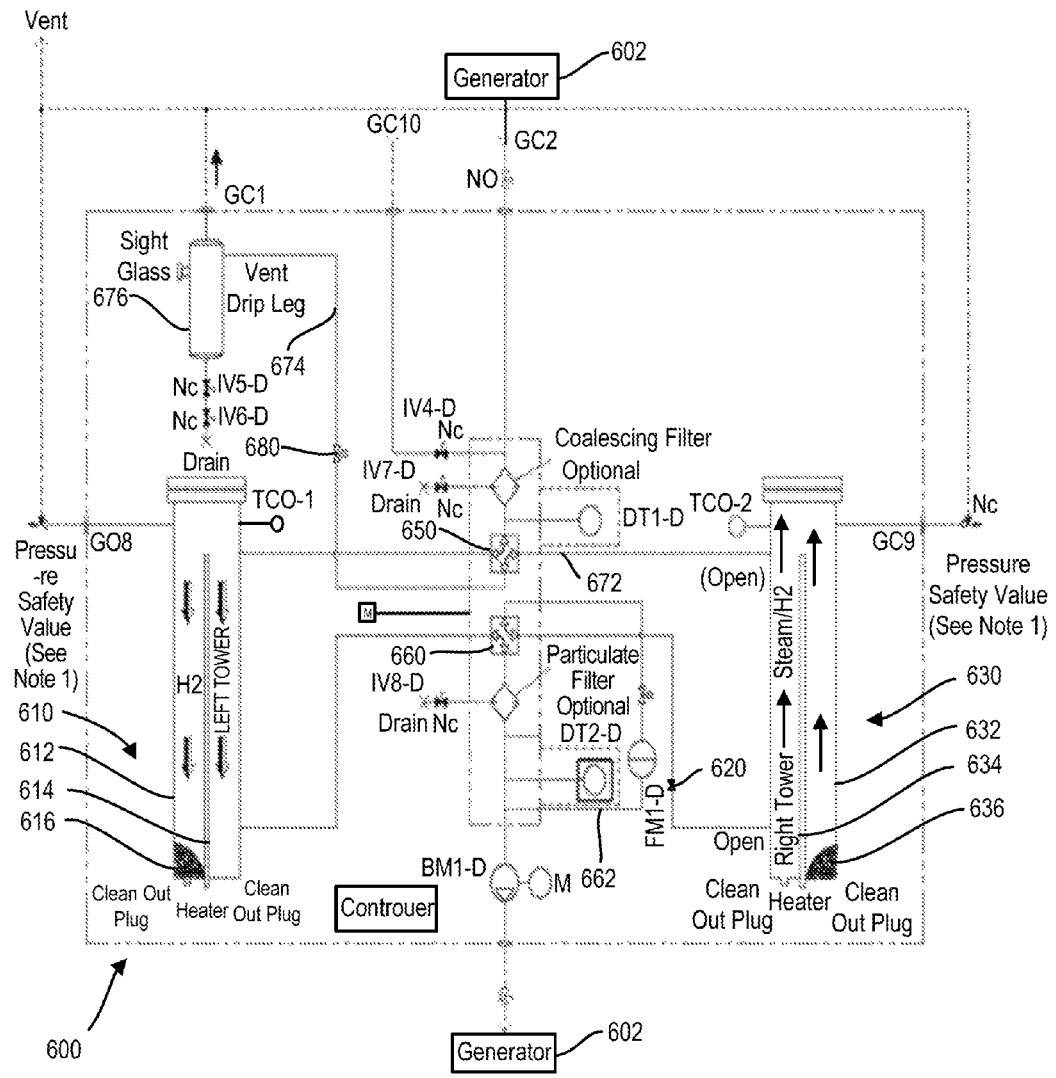
FIG. 10 is a diagrammatic illustration of the hydrogen gas dryer or system of FIG. 9 configured for purging remaining steam in a regenerated column.

With reference to FIG. 10, once the desiccant in second column is substantially dried, heater 134 is turned off and/or left on, and valve 620 is disposed in an open position to allow a supply of dry hydrogen gas to act as a purging gas to remove the remaining steam from column 630. At an appropriate time, valves or manifolds 650 and 660 may be operated to operably connect the second column for drying the hydrogen gas in the hydrogen-cooled generator, and at the same time, regenerate the desiccant in the first column in a generally similar manner as described above. The column regeneration is automated and take place based on, for example, programmable inlet and outlet dew point levels.

The heater may heat the desiccant to about 300 degrees Celsius, and the regenerative process takes about 2 hours to about 4 hours. The purging process may take from about 1 minute to about 30 minutes, and desirably about 10 minutes. For example, the heating and allowing the vaporized water to vent may be performed for a first predetermined time, and the purging process of supplying generally dry hydrogen to purge remaining vaporized water from the substantially dry desiccant for a second predetermined time of about one-tenth to about one-twentieth of the first predetermined time.

Figure 11:
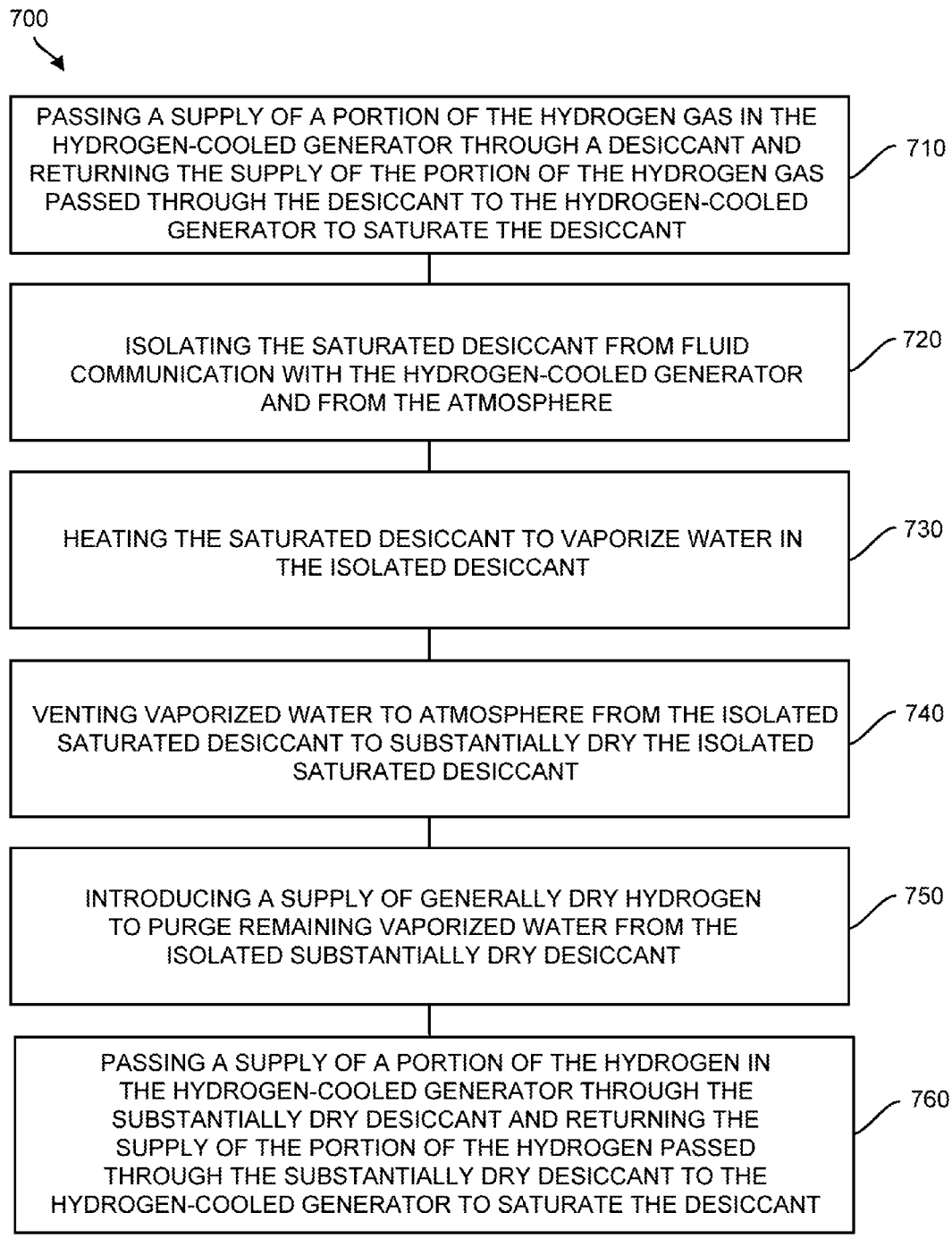
FIG. 11 is a flowchart of one embodiment of a process for drying or removing water from hydrogen gas for use in hydrogen-cooled generators in accordance with aspects of the present disclosure.
Figure 12:
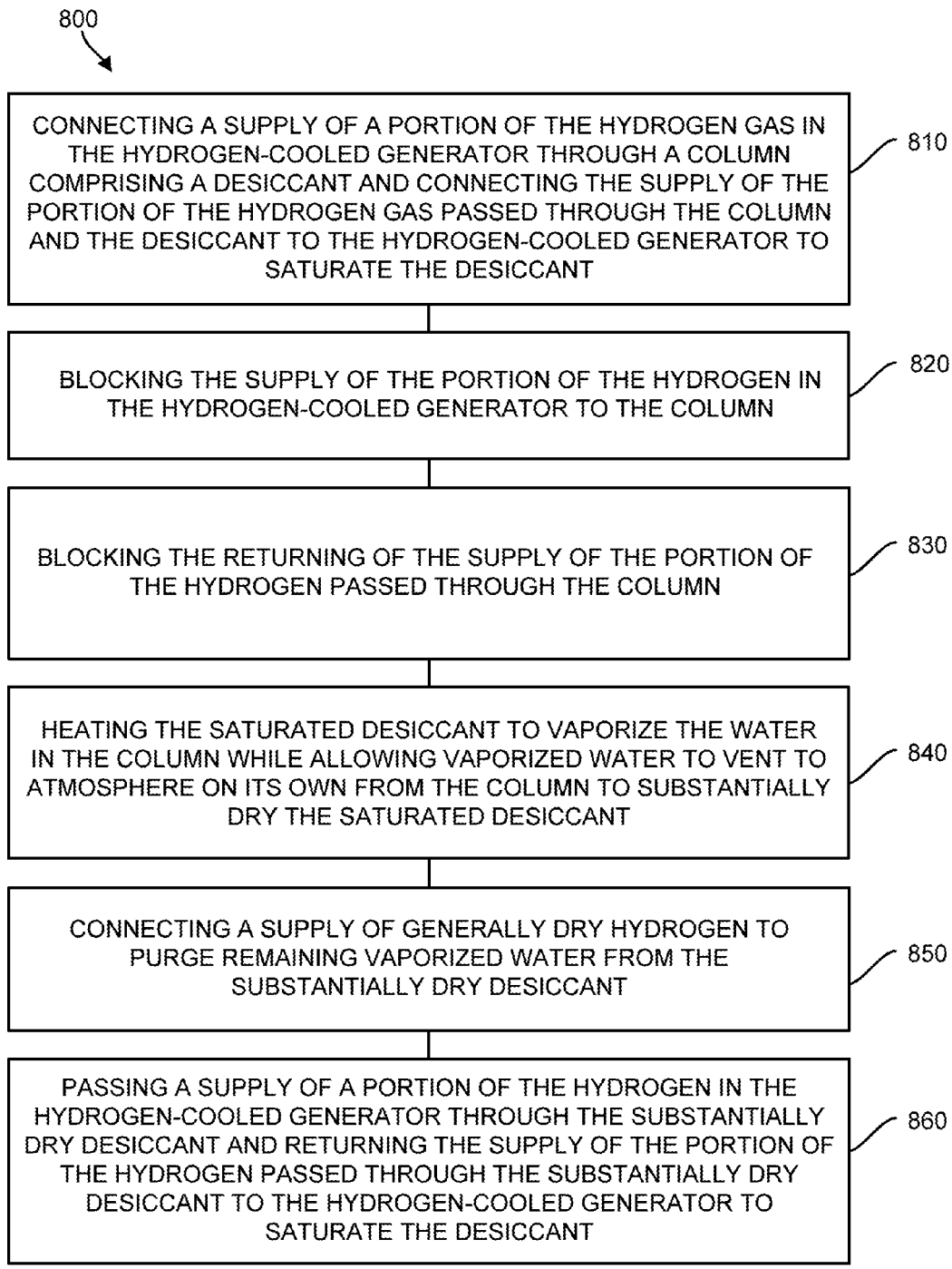
FIG. 12 is a flowchart of another embodiment of a process for drying or removing water from hydrogen gas for use in hydrogen-cooled generators in accordance with aspects of the present disclosure.

FIG. 11 is a flowchart of one embodiment of a process 700 for drying or removing water from hydrogen gas for use in hydrogen-cooled generators in accordance with aspects of the present disclosure. For example, process 700 may include at 710, passing a supply of a portion of the hydrogen gas in the hydrogen-cooled generator through a desiccant and returning the supply of the portion of the hydrogen passed through the desiccant to the hydrogen-cooled generator to saturate the desiccant, and at 720, isolating the saturated desiccant from fluid communication with the hydrogen-cooled generator and from the atmosphere. At 730, the saturated desiccant may be heated to vaporize the water in the isolated desiccant, which at 740, the vaporized water is vented to atmosphere from the isolated saturated desiccant to substantially dry the isolated saturated desiccant. At 750, a supply of generally dry hydrogen is introduced to purge remaining vaporized water from the isolated substantially dry desiccant. At 760, a supply of a portion of the hydrogen in the hydrogen-cooled generator is passed through the substantially dry desiccant and the supply of the portion of the hydrogen passed through the substantially dry desiccant is returned to the hydrogen-cooled generator to saturate the desiccant FIG. 12 is a flowchart of another embodiment of a process 800 for drying or removing water from hydrogen gas for use in hydrogen-cooled generators in accordance with aspects of the present disclosure. At 810, the process includes returning a supply of a portion of the hydrogen gas in the hydrogen-cooled generator through a column comprising a desiccant and connecting the supply of the portion of the hydrogen gas passed through the column and the desiccant to the hydrogen-cooled generator to saturate the desiccant, at 820, blocking the supply of the portion of the hydrogen gas in the hydrogen-cooled generator to the column, and at 830, blocking the return of the supply of the portion of the hydrogen gas passed through the column. At 840, the saturated desiccant is heated to vaporize the water in the column while allowing the vaporized water to vent to atmosphere on its own from the column to substantially dry the saturated desiccant. At 850, a supply of generally dry hydrogen is connected to purge remaining vaporized water from the substantially dry desiccant. At 860, a supply of a portion of the hydrogen in the hydrogen-cooled generator is passed through the substantially dry desiccant and returning the supply of the portion of the hydrogen gas passed through the substantially dry desiccant is returned to the hydrogen-cooled generator to saturate the desiccant.

In the various systems of the present disclosure, the systems may receive a portion of the hydrogen cooling gas, for example, via a conduit from the hydrogen-cooled generator. The systems may include a suitable dryer system which incorporates a desiccant or drying agent, medium, media, catalytic material, or filter, and may include calcium chloride, or other material or materials. After the hydrogen cooling gas passes through the dryer, the dried hydrogen cooling gas is returned, for example, via one or more conduits to the hydrogen-cooled generator. The desiccant eventually becomes saturated with water during the drying process of the hydrogen gas from the hydrogen-cooled generator. In addition, the systems may also incorporate continuous dew point monitoring and display of the dew point for both inlet and outlet lines to the dryer. The result is that operators can monitor the efficiency of the drying process, and allow dryer regeneration at the optimum time. Other displays or gages may include pressure, temperature, and flow rate. The present technique may result in a reduction of the use of hydrogen as a carrier gas during the regeneration process by about 50 percent, 70 percent, or 90 percent. The system component may reduce, if not eliminate entirely the use of the carrier or purging gas. For example, reorientation of the system components may allow the system to more efficiently regenerate the column or columns. The present technique may be employed in new drying systems and may be employed in retrofit of existing drying systems. The new drying systems may be a stand along system or may be part of a modular system.

The fluid controls of the present disclosure may be one or more solenoid valves, two-way valves, three-way valves, other valves, manifolds or manifolding, steering mechanisms, and combination thereof. It will be appreciated that other suitable fluid control devices may be employed in connection with implementing the present disclosure. The various valves may be linked electronically or mechanically so that they operate at the same time to, for example, change from one configuration to another. The purging gas may be other inert gases such as nitrogen and helium, with may be purged with hydrogen prior to reconnection of the generated column for drying hydrogen gas in the hydrogen cooled generator. Other means for controlling the regeneration process may include dew points, time, saturation, and combination thereof. Suitable sensors may be employed.

Figure 13:
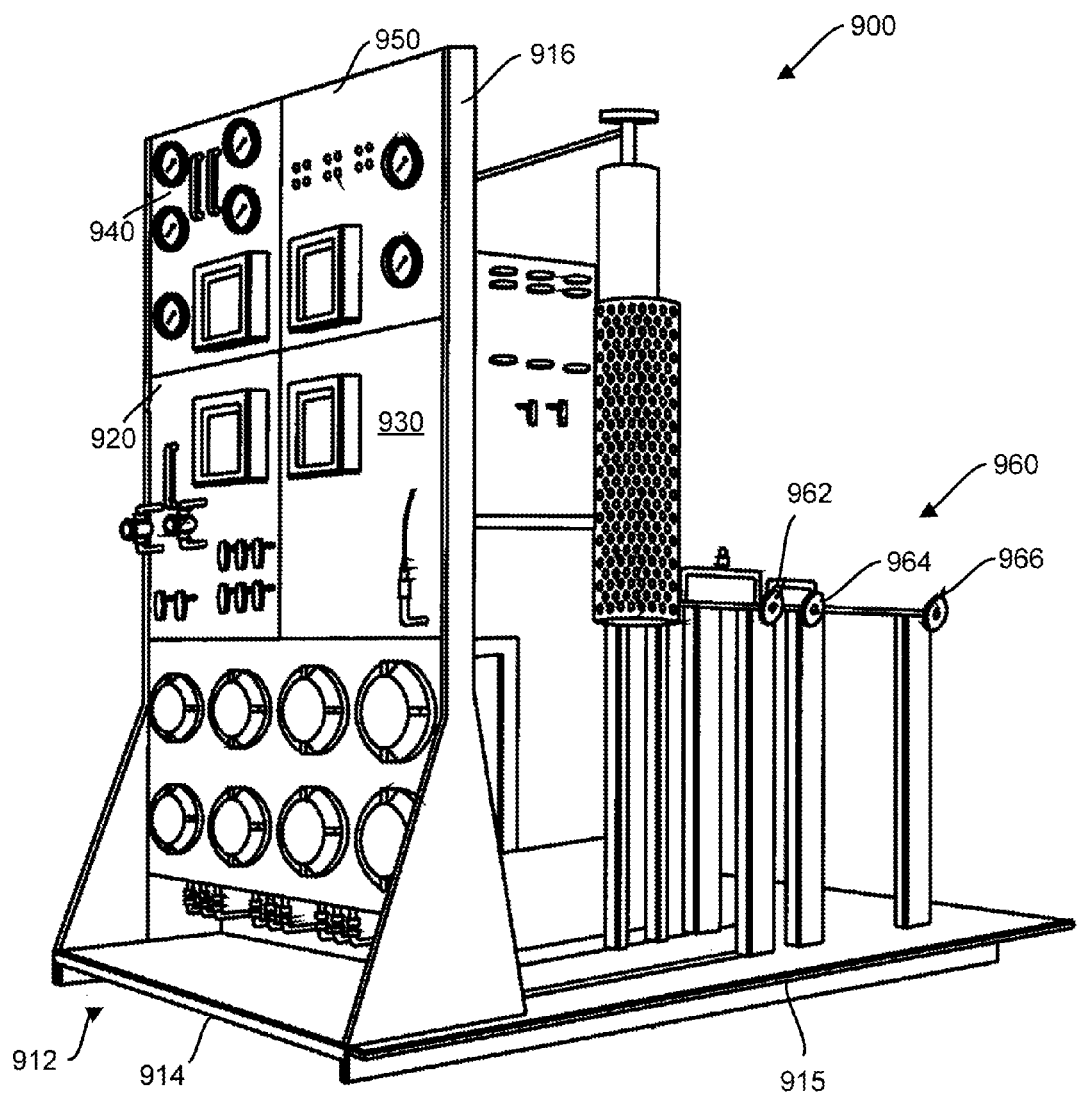
FIG. 13 is a perspective view of a modular system for monitoring a hydrogen-cooled generator in accordance with aspects of the present disclosure.

With reference to FIG. 13, therein illustrated is a modular system 900 in accordance with aspects of the present disclosure. In one aspect, modular system 900 may be configured as a compact modular system. Modular system 900 may include a readily movable skid 912 having a platform 914 supported on runners 915. Skid 912 may also include an upwardly extending support 916 attached to platform 914 and attachable to a hydrogen gas purity monitoring module 920, a generator overheat monitoring module 930, a hydrogen gas dryer module 940 incorporating the present techniques as described above, and a gas/generator monitoring module 950. Attached to skid 912 is also a gas manifold 960 having an air inlet 962, an hydrogen gas inlet 964, and a carbon dioxide (CO2) inlet 966. Configuring the modular system as a compact modular system may also provide a customizable, cost-efficient approach to monitoring hydrogen-cooled generators. The modular system can be used with both new power plants and retrofit projects. The modular system provides information and data to generator OEMs (Original Equipment Manufacturers) and utilities which can be used to reduce the likelihood of outages and maximize performance. In addition, the engineering and installation costs for installing and connecting the modular system to a hydrogen-cooled generator may be reduced compared to installing and connecting separate stand-alone systems to the hydrogen-cooled generator. It will be appreciated that any or each of the various modules may include a processor and may be provided with a communication link for connecting to a remote control unit and/or a display for displaying generated data regarding the performance of the hydrogen-cooled generator. In addition, the processor may include, for example, a central processing unit (CPU), a memory, and one or more input/output devices, which are well known in the art. It will also be appreciated by those skilled in the art that a utility may choose the various components or modules which are to be assembled into the modular system. In addition, the modular system may include more than one of the same components or modules, and may include more or less than the four modules described above. Further description of modular systems is found in U.S. Pat. No. 6,959,585, and in U.S. Pat. No. 7,448,252, which applications are incorporated in their entirety herein by reference, and which may employ the modular hydrogen gas dryer techniques of the present disclosure as described above.

While the dimensions and types of materials described herein are intended to define the parameters of the various embodiments, they are by no means limiting and are merely exemplary. Many other embodiments will be apparent to those of skill in the art upon reviewing the above description. The scope of the various embodiments should, therefore, be determined with reference to the appended claims, along with the full scope of equivalents to which such claims are entitled.

In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112, sixth paragraph, unless and until such claim limitations expressly use the phrase "means for" followed by a statement of function void of further structure.

It is to be understood that not necessarily all such objects or advantages described above may be achieved in accordance with any particular embodiment. Thus, for example, those skilled in the art will recognize that the systems and techniques described herein may be embodied or carried out in a manner that achieves or optimizes one advantage or group of advantages as taught herein without necessarily achieving other objects or advantages as may be taught or suggested herein.

While the invention has been described in detail in connection with only a limited number of embodiments, it should be readily understood that the invention is not limited to such disclosed embodiments. Rather, the invention can be modified to incorporate any number of variations, alterations, substitutions, or equivalent arrangements not heretofore described, but which are commensurate with the spirit and scope of the invention. Additionally, while various embodiments of the invention have been described, it is to be understood that aspects of the disclosure may include only some of the described embodiments. Accordingly, the invention is not to be seen as limited by the foregoing description, but is only limited by the scope of the appended claims.

This written description uses examples to disclose the invention, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. A method for drying hydrogen gas for use in a hydrogen-cooled generator, the method comprising:
   passing a supply of a portion of the hydrogen gas in the hydrogen-cooled generator through a desiccant and returning the supply of the portion of the hydrogen gas passed through the desiccant to the hydrogen-cooled generator to saturate the desiccant;
   isolating the substantially saturated desiccant from fluid communication with the hydrogen-cooled generator and from the atmosphere;
   heating the substantially saturated desiccant to vaporize water in the isolated desiccant;
   venting the vaporized water to atmosphere from the isolated saturated desiccant to substantially dry the isolated saturated desiccant;
   introducing a supply of generally dry hydrogen gas to purge remaining vaporized water from the isolated substantially dry desiccant; and
   passing a supply of a portion of the hydrogen gas in the hydrogen-cooled generator through the substantially dry desiccant and returning the supply of the portion of the hydrogen gas passed through the substantially dry desiccant to the hydrogen-cooled generator to saturate the desiccant.

2. The method of claim 1 wherein the heating and venting comprises heating and venting for a first predetermined time, and the introducing comprises introducing the purging for a second predetermined time about one-tenth to about one-twentieth of the first predetermined time.

3. The method of claim 1 wherein the heating and venting comprises heating and venting for about 2 to about 4 hours, and the introducing comprises introducing the purging for about 10 minutes.

4. A method for use drying hydrogen gas used in a hydrogen-cooled generator, the method comprising:
   connecting a supply of a portion of the hydrogen gas in the hydrogen-cooled generator through a column comprising a desiccant and connecting the supply of the portion of the hydrogen gas passed through the column and the desiccant to the hydrogen-cooled generator to substantially saturate the desiccant;
   blocking the supply of the portion of the hydrogen gas in the hydrogen-cooled generator to the column;
   blocking the returning of the supply of the portion of the hydrogen gas passed through the column;
   heating the saturated desiccant to vaporize water in the column while allowing the vaporized water to vent to atmosphere on its own from the column to substantially dry the saturated desiccant;
   connecting a supply of generally dry hydrogen gas to purge remaining vaporized water from the substantially dry desiccant; and
   connecting a supply of a portion of the hydrogen gas in the hydrogen-cooled generator through the substantially dry desiccant and returning the supply of the portion of the hydrogen gas passed through the substantially dry desiccant to the hydrogen-cooled generator to saturate the desiccant.

5. The method of claim 4 wherein the heating and allowing the vaporized water to vent comprises heating and allowing the vaporized water to vent for a first predetermined time, and the connecting comprises connecting the supply of generally dry hydrogen gas to purge remaining vaporized water from the substantially dry desiccant for a second predetermined time about one-tenth to about one-twentieth of the first predetermined time.

6. The method of claim 4 wherein the heating and allowing the vaporized water to vent comprises heating and allowing the vaporized water to vent for about 2 hours to about 3 hours, and the connecting comprises connecting the supply of generally dry hydrogen gas to purge remaining vaporized water from the substantially dry desiccant for about 10 minutes.

7. The method of claim 1 further comprising:
   passing, after the isolating the substantially saturated desiccant from fluid communication with the hydrogen-cooled generator, a supply of a portion of the hydrogen gas in the hydrogen-cooled generator through a second desiccant and returning the supply of the portion of the hydrogen gas passed through the second desiccant to the hydrogen-cooled generator to saturate the second desiccant.

8. The method of claim 7 further comprising:
   isolating the substantially saturated second desiccant from fluid communication with the hydrogen-cooled generator and from the atmosphere;
   heating the substantially saturated second desiccant to vaporize water in the isolated second desiccant;
   venting the vaporized water to atmosphere from the isolated saturated second desiccant to substantially dry the isolated saturated second desiccant;
   introducing a supply of generally dry hydrogen gas to purge remaining vaporized water from the isolated substantially dry second desiccant.

9. The method of claim 8 further comprising passing a supply of a portion of the hydrogen gas in the hydrogen-cooled generator through the substantially dry second desiccant and returning the supply of the portion of the hydrogen gas passed through the substantially dry second desiccant to the hydrogen-cooled generator to saturate the second desiccant.

10. The method of claim 8 wherein the heating and venting of the second desiccant comprises heating and venting for a first predetermined time, and the introducing comprises introducing the purging for a second predetermined time about one-tenth to about one-twentieth of the first predetermined time.

11. The method of claim 8 wherein the heating and venting of the second desiccant comprises heating and venting for about 2 to about 4 hours, and the introducing comprises introducing the purging for about 10 minutes.

12. The method of claim 8 wherein the passing the supply of the portion of the hydrogen gas in the hydrogen-cooled generator through the desiccant and returning the supply of the portion of the hydrogen gas passed through the desiccant to the hydrogen-cooled generator to saturate the desiccant is after the isolating the substantially saturated second desiccant from fluid communication with the hydrogen-cooled generator.

13. The method of claim 8 further comprising alternatively selectively controlling, via a control device, the passing of the supplies of the portions of hydrogen gas to the desiccant and to the second desiccant.

14. The method of claim 9 further comprising alternatively selectively controlling, via a control device, the returning the supply of the portion of the hydrogen gas passed through the substantially dry desiccant to the hydrogen-cooled generator, and the returning the supply of the portion of the hydrogen gas passed through the substantially dry second desiccant to the hydrogen-cooled generator to saturate the second desiccant.

15. The method of claim 4 further comprising:
connecting, after the blocking the supply of the portion of the hydrogen gas in the hydrogen-cooled generator to the column and the blocking the returning of the supply of the portion of the hydrogen gas passed through the column, a supply of a portion of the hydrogen gas in the hydrogen-cooled generator through a second column comprising a second desiccant and connecting the supply of the portion of the hydrogen gas passed through the second column and the second desiccant to the hydrogen-cooled generator to substantially saturate the second desiccant.

16. The method of claim 15 further comprising:
blocking the supply of the portion of the hydrogen gas in the hydrogen-cooled generator to the second column;
blocking the returning of the supply of the portion of the hydrogen gas passed through the second column;
heating the saturated second desiccant to vaporize water in the second column while allowing the vaporized water to vent to atmosphere on its own from the second column to substantially dry the saturated second desiccant; and
connecting a supply of generally dry hydrogen gas to purge remaining vaporized water from the substantially dry second desiccant.

17. The method of claim 16 further comprising connecting a supply of a portion of the hydrogen gas in the hydrogen-cooled generator through the substantially dry second desiccant and returning the supply of the portion of the hydrogen gas passed through the substantially dry second desiccant to the hydrogen-cooled generator to saturate the desiccant.

18. The method of claim 16 wherein the heating the saturated second desiccant and allowing the vaporized water to vent comprises heating and allowing the vaporized water to vent for a first predetermined time, and the connecting comprises connecting the supply of generally dry hydrogen gas to purge remaining vaporized water from the substantially dry second desiccant for a second predetermined time about one-tenth to about one-twentieth of the first predetermined time.

19. The method of claim 16 wherein the heating the saturated second desiccant and allowing the vaporized water to vent comprises heating and allowing the vaporized water to vent for about 2 hours to about 3 hours, and the connecting comprises connecting the supply of generally dry hydrogen gas to purge remaining vaporized water from the substantially dry second desiccant for about 10 minutes.

20. The method of claim 16 wherein the connecting the supply of the portion of the hydrogen gas in the hydrogen-cooled generator through the second column comprising the second desiccant and the connecting the supply of the portion of the hydrogen gas passed through the column and the second desiccant to the hydrogen-cooled generator to substantially saturate the second desiccant is after the blocking the supply of the portion of the hydrogen gas in the hydrogen-cooled generator to the column and the blocking the returning of the supply of the portion of the hydrogen gas passed through the column.

21. The method of claim 15 further comprising using a control device to alternatively selectively control the connecting the supply of the portion of the hydrogen gas in the hydrogen-cooled generator through the column and the connecting the supply of the portion of the hydrogen gas in the hydrogen-cooled generator through the second column.

22. The method of claim 17 further comprising using a control device to alternatively selectively control the returning the supply of the portion of the hydrogen gas passed through the substantially dry desiccant to the hydrogen-cooled generator to saturate the desiccant, and the returning the supply of the portion of the hydrogen gas passed through the substantially dry second desiccant to the hydrogen-cooled generator to saturate the second desiccant.

* * * * *